(12) United States Patent
Omata et al.

(10) Patent No.: US 9,344,621 B2
(45) Date of Patent: May 17, 2016

(54) IMAGING DEVICE AND CONTROL METHOD FOR IMAGING DEVICE

(71) Applicant: Olympus Corporation, Shibuya-ku, Tokyo (JP)

(72) Inventors: Yoshinobu Omata, Hachioji (JP); Kazumasa Kunugi, Hachioji (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/879,144

(22) Filed: Oct. 9, 2015

(65) Prior Publication Data
US 2016/0105600 A1    Apr. 14, 2016

(30) Foreign Application Priority Data

Oct. 14, 2014 (JP) ................... 2014-209957

(51) Int. Cl.
  G03B 13/36 (2006.01)
  H04N 5/232 (2006.01)
  G01B 11/14 (2006.01)
  G02B 7/34 (2006.01)

(52) U.S. Cl.
  CPC ............ *H04N 5/23212* (2013.01); *G01B 11/14* (2013.01); *G02B 7/34* (2013.01); *G03B 13/36* (2013.01)

(58) Field of Classification Search
  CPC ...... G03B 13/36; H04N 5/23212; G02B 7/34; G02B 7/346
  See application file for complete search history.

(56) References Cited

U.S. PATENT DOCUMENTS

| | | | |
|---|---|---|---|
| 5,900,927 A | 5/1999 | Hasegawa | |
| 5,937,216 A * | 8/1999 | Homma | G02B 7/28 396/95 |
| 6,115,553 A * | 9/2000 | Iwamoto | G02B 7/346 396/104 |
| 2004/0105673 A1* | 6/2004 | Yoshida | G03B 13/36 396/128 |
| 2007/0196091 A1* | 8/2007 | Yamaguchi | G03B 13/36 396/95 |
| 2015/0054972 A1* | 2/2015 | Hashimoto | G02B 7/34 348/216.1 |

FOREIGN PATENT DOCUMENTS

| | | |
|---|---|---|
| JP | 08-211284 | 8/1996 |
| JP | 2008-134413 | 6/2008 |
| JP | 2008-147821 | 6/2008 |

\* cited by examiner

*Primary Examiner* — W B Perkey
(74) *Attorney, Agent, or Firm* — John C. Pokotylo; Straub & Pokotylo

(57) ABSTRACT

An imaging device which includes an imaging element having a phase difference detection pixel, and which performs autofocus using AF areas each including a plurality of sub-areas, the imaging device comprising: a calculation section configured to perform correlation calculation based on a focus detection signal corresponding to each of the plurality of sub-areas and output a degree of reliability; an AF area selection section configured to select an AF area including a large number of sub-areas in each of which the degree of reliability calculated corresponding to the plurality of sub-areas is higher; a moving body prediction calculation section configured to perform moving body prediction calculation using distance measurement data that is calculated by the correlation calculation based on a focus detection signal of the selected AF area; and a focus control section configured to perform focus adjustment based on a result of the moving body prediction calculation.

15 Claims, 9 Drawing Sheets

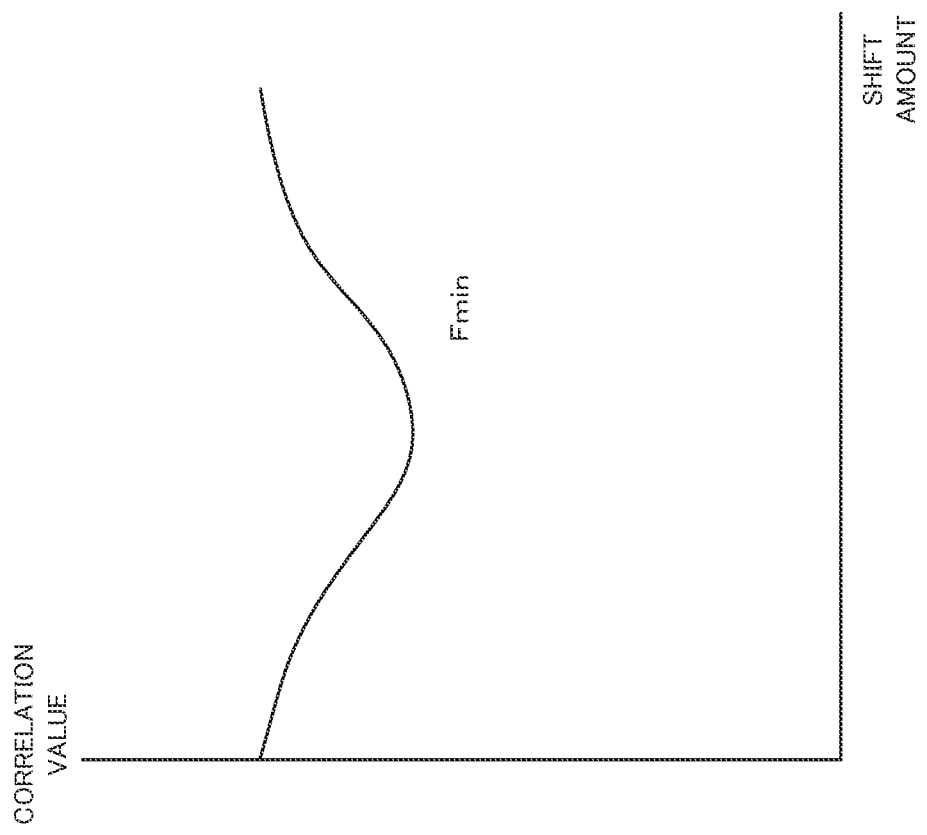
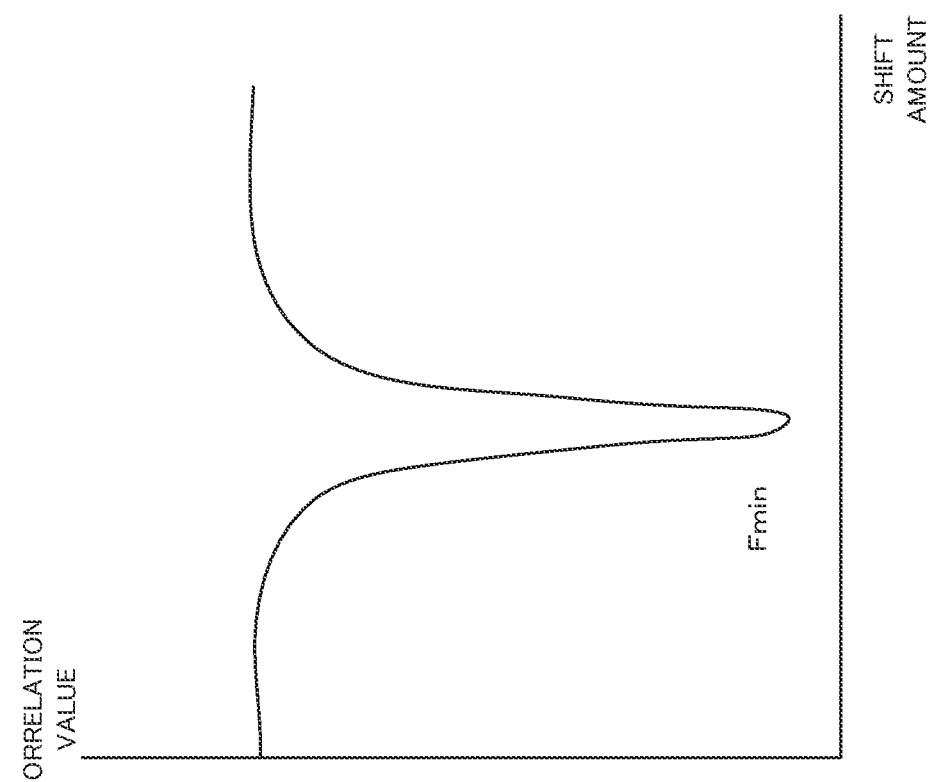

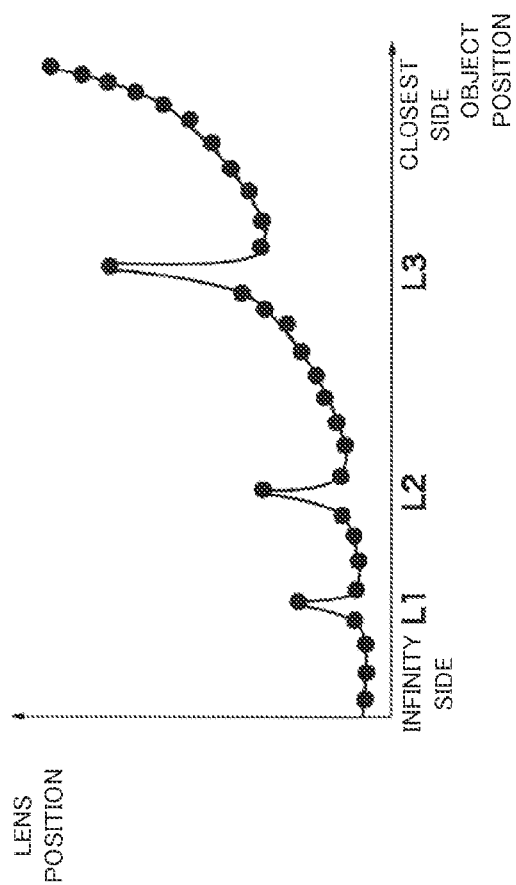
FIG. 9B
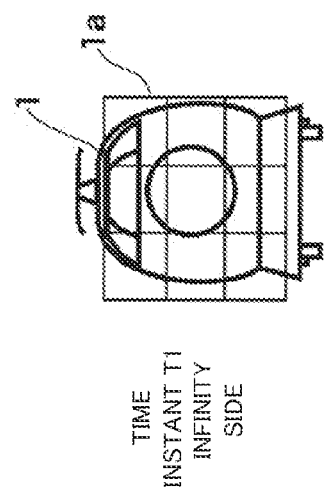
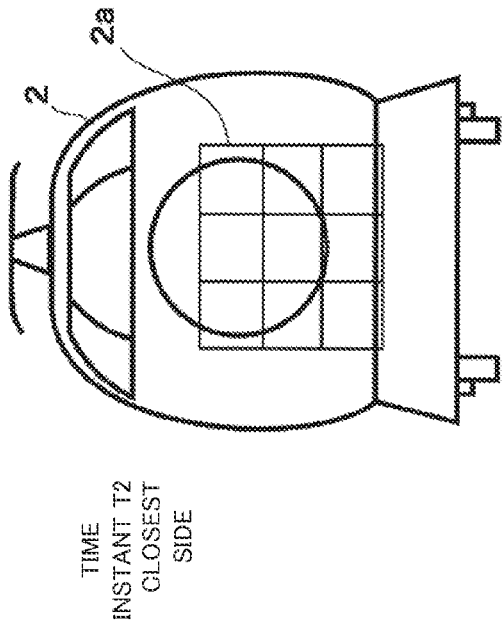
FIG. 9A ial on the filing date of prior Japanese Patent Application No. 2014-209957 filed on Oct. 14, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device and a control method for the imaging device capable of autofocus at high speed and with high accuracy by measuring a distance to the position of an object to be photographed using phase difference detection pixels formed on an imaging element.

2. Description of Related Art

High functionality of a digital camera has been astonishing, and the performance thereof is also progressing day by day. Various functions allow photographing of a high quality photograph regardless of the skill of a photographer. Autofocus is also one of these functions, and in order to appropriately photograph a moving object, it is necessary to accurately measure a distance to the position of the object, predict the position of the object based on the measured information, and drive the lens.

The autofocus system can be basically classified into an active system and a passive system. The active system is the system for irradiating an object with an infrared ray or the like from a camera and measuring the distance to the object using a signal reflected by the object. This system is used for some of digital camcorders and the like, but rarely used for lens interchangeable digital cameras and the like. On the other hand, the passive system is the system for performing ranging based on the light flux passing through an imaging lens, and is classified into a contrast system and a phase difference system.

The contrast system (hereinafter, contrast AF) is widely used for a compact digital camera and a lens interchangeable digital camera, and is the system for reading an image signal from an imaging element while moving the position of a focus lens in the optical axis direction, calculating a contrast value (AF evaluation value) from the image signal for each frame, searching the maximum value of the contrast values, and setting the position of the focus lens where the maximum value is obtained, as the focusing position.

The phase difference system is the system for dividing the pupil of an imaging lens into a pair of regions, detecting a relative positional change between a pair of images formed by a light flux passing through the divided pupil regions, and thereby detecting the focusing position. This phase difference system includes: a system with a dedicated detection unit (hereinafter, a dedicated unit system) (Japanese Laid-Open Patent Publication No. 8-211284, hereinafter referred to as Patent Literature 1) and Japanese Laid-Open Patent Publication No. 7-110435, hereinafter referred to as Patent Literature 2); and a system of forming a pixel for detecting the phase difference on an imaging element during the course of manufacturing the imaging element (hereinafter, an imaging-plane phase difference system) (Japanese Laid-Open Patent Publication No. 2008-134413, hereinafter referred to as Patent Literature 3) and Japanese Laid-Open Patent Publication No. 2008-147821, hereinafter referred to as Patent Literature 4). The phase difference system is quite often used for the lens interchangeable digital camera.

The contrast system needs the image data obtained by photographing at different timings while varying the lens position in order to detect the focusing position, on the other hand, the phase difference system is capable of detecting the focusing position from the image data obtained by one exposure. Therefore, the phase difference system is suitable for photographing a moving object. Moreover, in the dedicated unit system of the phase difference system a dedicated detection unit needs to be provided inside a camera and therefore the camera body becomes bigger and heavier. Therefore, the system capable of appropriately photographing a moving object and suitable for a compact and lightweight camera body is the imaging-plane phase difference system.

In the imaging-plane phase difference system, a phase detection pixel is formed on an imaging element. That is, the phase difference detection pixel instead of the imaging pixel is formed, and therefore if the phase difference detection pixels are arranged densely on the imaging element, the image degradation of a photographed image becomes significant, and the imaging-plane phase difference system is inappropriate for use in a digital camera. Accordingly, in order to reduce the influence on a photographed image as much as possible, it is preferable to roughly and discretely arrange the phase difference detection pixels to be formed on the imaging element.

However, if the phase difference detection pixels are discretely arranged on the imaging element, a reduction in AF accuracy will occur due to an object with a fine pattern and/or due to a distance measurement variation (a light amount difference or the like between the left and right apertures) when the position of an object slightly changes on an imaging plane, such as the movement of an object. Therefore, in particular, in measuring a distance to a moving object by continuous AF (hereinafter, abbreviated as C-AF), a distance measurement variation causes a variation (error) also in the result of moving body prediction calculation, and therefore the focusing accuracy of an image to be photographed will decrease. Then, a decrease in the focusing accuracy of an image to be photographed by C-AF is preferably prevented by suppressing the variation for each measurement.

The decrease in the focusing accuracy is described using FIG. 9A and FIG. 9B. FIG. 9A and FIG. 9B show the position of an object and distance measurement result during photographing. FIG. 9A shows that an object is moving toward the near side from the infinity side. That is, an image 1 indicates an object image at a time instant T1, and an image 2 indicates the object image at a time instant T2. The object image becomes gradually bigger because it is moving toward the near side from the infinity side. 3×3 frames 1a and 2a in the images 1 and 2 indicate the respective AF areas. In the respective AF areas, the focusing position of the object is calculated by detecting the defocusing amount.

In FIG. 9B, the horizontal axis represents the object position and the vertical axis represents the lens position in focusing that is calculated based on the detected defocusing amount. As seen from FIG. 9B, when an object is on the infinity side, a value indicative of the focusing position of a lens is small, and as the object approaches the nearer side, the value increases, and becomes maximum when the object is on the nearest side. In the example shown in FIG. 9B, at object positions L1, L2, and L3, the lens position significantly shifts from the lens position at the other positions, and this is due to a distance measurement variation. This distance measurement variation is caused by the arrangement method in arranging the phase difference detection pixels on the imaging element, the pattern of an object, the position of an object, and the like. If there is a distance measurement variation in performing moving body prediction based on these data, the prediction accuracy will decrease due to the influence of the variation and the focusing accuracy will decrease.

In Patent Literature 1, in the autofocus system using the AF dedicated unit, focus detection is performed on a plurality of portions of an object, and the focus detection result is displayed or the photographing lens is driven taking into consideration the depth of an object from the detection results of a plurality of calculated image deviation amounts. Patent Literature 1 discloses that a photoelectric output is divided into a plurality of portions to calculate a plurality of image deviation amounts. However, the technique disclosed in Patent Literature 1 cannot cope with a distance measurement variation that is generated when the position of an object slightly varies on an imaging plane, such as a case where an object has a fine pattern and a case where an object moves.

Patent Literature 2 discloses that the photographing range is divided into a plurality of regions, the contrast is calculated for each region, and a region where a main object exists is obtained. However, in Patent Literature 2, the contrast is used for detection of a main object, but is not used for suppression of the distance measurement variation.

Patent Literature 3 discloses that when the aperture is narrowed in order to secure the AF accuracy of the imaging-plane phase difference system, a photoelectric conversion section configured to generate each charge signal related to a pair of image sequences is selected in accordance with an aperture value. However, the technique disclosed in Patent Literature 3 cannot cope with a distance measurement variation that is generated when the position of an object slightly varies on an imaging plane, such as a case where an object has a fine pattern and a case where an object moves.

Patent Literature 4 discloses that in order to suppress a reduction in AF accuracy due to an aperture value in the imaging-plane phase difference system, a pixel of a different light-shielding rate is selected based on an aperture value. However, the AF system described in Patent Literature 4 cannot suppress the distance measurement variation.

SUMMARY OF THE INVENTION

The present invention has an object to provide a compact and lightweight imaging device and a control method for the imaging device capable of suppressing a distance measurement variation even when a phase difference detection system is used as an autofocus system and of accurately photographing a moving object using continuous AF.

According to an aspect of the present invention, there is provided an imaging device, which includes an imaging element having a phase difference detection pixel formed therein that generates a focus detection signal by pupil-dividing and photoelectrically converting a light flux from a photographing optical system, and which performs autofocus using a plurality of AF areas each including a plurality of sub-areas that is obtained by dividing the AF area, the imaging device comprising: a calculation section configured to perform correlation calculation based on a focus detection signal corresponding to each of the plurality of sub-areas and output a degree of reliability; an AF area selection section configured to select an AF area including a large number of sub-areas in each of which the degree of reliability calculated corresponding to the plurality of sub-areas is higher; a moving body prediction calculation section configured to perform moving body prediction calculation using distance measurement data that is calculated by the correlation calculation based on a focus detection signal of the selected AF area; and a focus control section configured to perform focus adjustment based on a result of the moving body prediction calculation.

According to another aspect of the present invention, there is provided a control method for an imaging device, which includes an imaging element that generates a focus detection signal by pupil-dividing and photoelectrically converting a light flux from a photographing optical system, in which each of a plurality of AF areas is divided into a plurality of sub-areas, and which performs autofocus using the plurality of AF areas, the control method comprising: a calculation step of performing correlation calculation based on a focus detection signal corresponding to each of the plurality of sub-areas, and outputting a degree of reliability; an AF area selection step of selecting an AF area including a large number of sub-areas in each of which the degree of reliability calculated corresponding to the plurality of sub-areas is higher; and a focus control step of performing focus adjustment using distance measurement data that is calculated by the correlation calculation based on a focus detection signal of the selected AF area.

BRIEF DESCRIPTION OF THE DRAWINGS

FIG. 8A and FIG. 8B are graphs illustrating the determination of reliability in the camera in the embodiment of the present invention.

FIG. 9A and FIG. 9B illustrate a distance measurement variation in measuring a distance to an object by C-AF.

DETAILED DESCRIPTION OF THE PREFERRED EMBODIMENTS

Hereinafter, an example of a digital camera (hereinafter, simply referred to as a "camera") to which the present invention is applied is described. This camera includes an imaging element having a phase difference detection pixel formed therein that generates a focus detection signal by pupil-dividing and photoelectrically converting a light flux from a photographing optical system, and performs autofocus using a plurality of AF areas.

This camera converts an object image into image data by the imaging section, and displays a live-view image of the object on a display section arranged on the backside of a main body based on this converted image data. A user observes the live-view display to determine a composition and a shutter timing. In a release operation, image data is recorded on a recording medium. The image data recorded on the recording medium can be reproduced and displayed on the display section when a reproduction mode is selected.

When a C-AF (Continuous Auto Focus) mode is set, this camera calculates a defocusing amount (hereinafter, unless otherwise specified, the defocusing amount includes also the defocusing direction) for each AF area every time image data is output from the imaging section. When the release operation is performed, this camera moves a focus lens to a focusing position based on the latest defocusing amount. Moreover, in calculating the defocusing amount for each AF area, the camera selects an AF area based on the value, such as the degree of reliability, from an AF sub-area obtained by further dividing the AF area.

Figure 1:
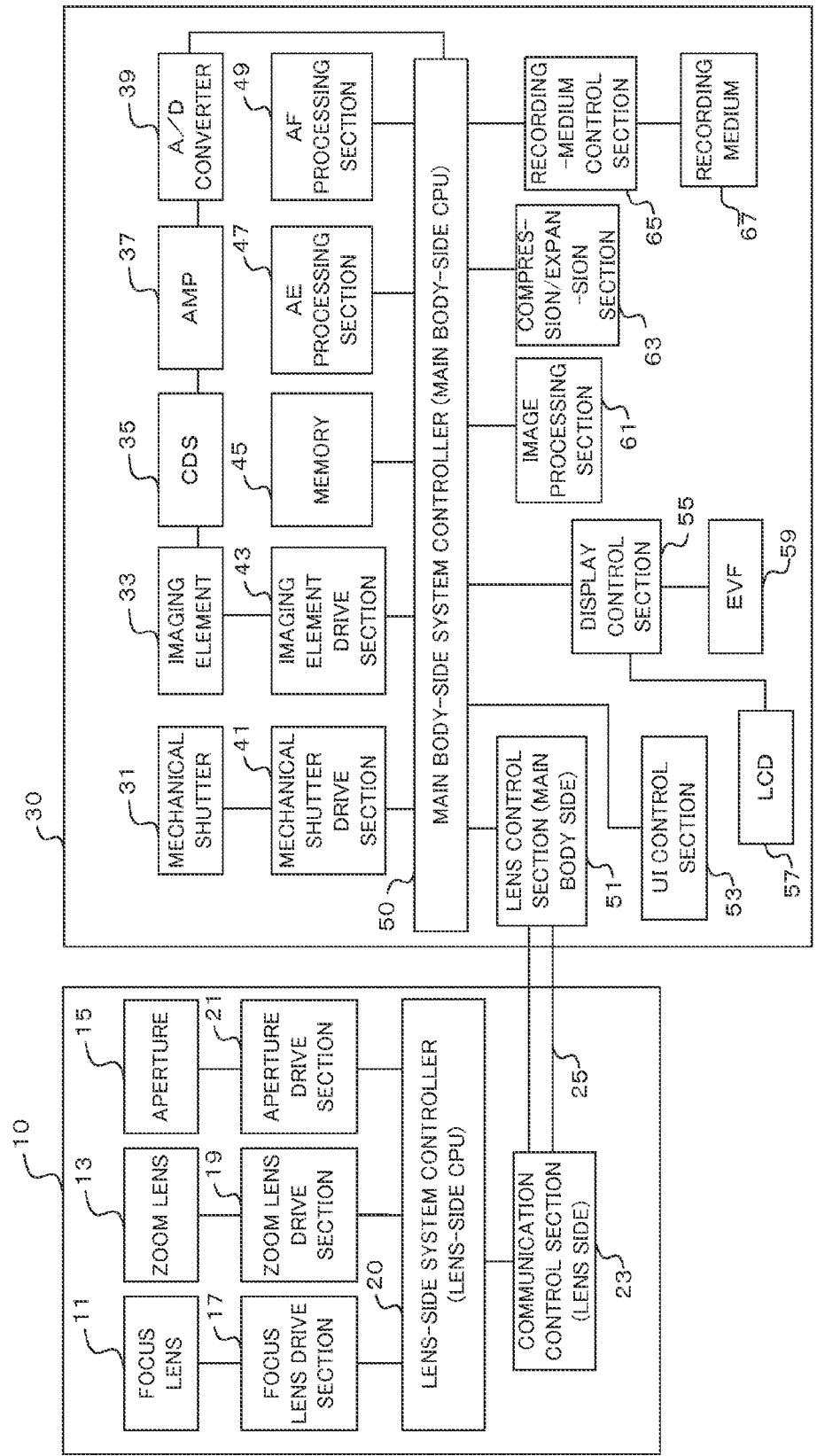
FIG. 1 is a block diagram mainly showing an electric configuration of a camera according to an embodiment of the present invention.

FIG. 1 is a block diagram mainly showing an electric configuration of the camera according to the embodiment. The camera according to the embodiment is a lens interchangeable camera, and comprises a camera body 30 and a photographing lens 10 attachable to the camera body 30. Note that the photographing lens 10 and the camera body 30 may be of course integrally constructed.

Inside the photographing lens 10, there is provided an optical lens comprising a focus lens 11 for forming an object image, a zoom lens 13, and the like. The focus lens 11 is capable of moving in the optical axis direction by a focus lens drive section 17, and the focus position of an object image is changed by the movement. The zoom lens 13 is capable of moving in the optical axis direction by a zoom lens drive section 19, and the focal length of the photographing lens is changed by the movement.

An aperture 15 is arranged on the optical axis of the optical lens, such as the focus lens 11 or zoom lens 13. The aperture 15 has an aperture diameter that may be varied by an aperture drive section 21, and controls the light amount of an object light flux passing through the optical lens.

The focus lens drive section 17, zoom lens drive section 19, and aperture drive section 21 are connected to a lens-side system controller 20. The lens-side system controller (hereinafter, referred to as a lens-side CPU) 20 includes a CPU (Central Processing Unit) and the like, controls each section inside the photographing lens 10 in accordance with a program stored in a storage section (not shown) and in accordance with an instruction from a system controller 50 (hereinafter, referred to as a main-body side CPU) of the camera body 30, and also outputs various types of information to the camera body 30.

A lens-side communication control section 23 is connected to the lens-side CPU 20. The lens-side communication control section 23 inputs and outputs data and control signals via the main-body side lens control section 51 provided inside the camera body 30 and via a communication path 25.

Inside the camera body 30, on the optical axis of the optical lens, and on the front side of the imaging element 33, a mechanical shutter 31 is provided. The mechanical shutter 31 is driven to be opened and closed by a mechanical shutter drive section 41 to control the transit time of the object light flux. The object light flux having passed through the optical lenses, such as the focus lens 11 and zoom lens 13, and aperture 15 passes through the mechanical shutter 31 in an opened state and is guided to the imaging element 33. Then, the mechanical shutter 31 is once closed in response to a photographing instruction from the main-body side CPU 50, and is then opened again, and after a manually set or automatically set exposure time, the mechanical shutter 31 is closed. This exposure time is controlled by the main-body side CPU 50.

The imaging element 33 has a photoelectric surface comprising a large number of light receiving elements arranged in a matrix, and an object image having passed through the optical lens is formed on the photoelectric surface and is then photoelectrically converted. In the front face of each light receiving element of the imaging element 33, color filters of respective RGB colors are arranged in a mosaic shape. The imaging element 33 is connected to an imaging element drive section 43, and reads, in synchronization with a vertical transfer clock signal and horizontal transfer clock signal supplied from the imaging element drive section 43, an electric charge stored for each pixel and outputs the same to a CDS (Correlated Double Sampling) 35 as an image signal. The exposure time of the electric charge in each pixel is controlled by an electronic shutter driving signal provided from the imaging element drive section. The arrangement of pixels of the imaging element 33 is described later using FIG. 2.

The CDS 35 is a correlated double sampling circuit, and removes the noise of the image signal output from the imaging element 33, performs gain adjustment and outputs the resulting image signal to an AMP 37. The AMP 37 amplifies the image signal and outputs the resulting image signal to an A/D converter 39. The A/D converter 39 converts the analog image signal to digital image data, and outputs the result to the main-body side CPU 50.

A memory 45 includes an electrically-rewritable nonvolatile memory and/or volatile memory, and stores the program for operating this camera, various types of adjustment data, and the like, and also temporarily stores various types of flag and image data, and the like.

An AE (Auto Exposure) processing section 47 calculates, based on the image data from the imaging pixel for generating an image of the imaging element 33, the brightness of an object image and outputs the result to the main-body side CPU 50. An AF (Auto Focus) processing section 49 calculates, based on the image data from a phase difference detection pixel of the imaging element 33, a defocusing amount and outputs the same to the main-body side CPU 50.

A UI (User Interface) control section 53 includes a non-illustrated switch, button, dial, touch screen, and the like, and detects the states of these switch and the like, and outputs the same to the main-body side CPU 50. Once a user operates the camera with a user interface, such as the switch or the like, the main-body CPU 50 controls the whole camera based on an output from the UI control section 53.

An LCD (Liquid Crystal Display) 57 is a planar thin-type display device utilizing a liquid crystal composition, and is arranged on the backside or the like of the camera body 30. Moreover, an EVF (Electronic View Finder) 59 is capable of observing a display device, such as a compact liquid crystal display, via an eyepiece section. The LCD 57 and EVF 59 display a live view image, a reproduced image, and other information images, based on the image data from the display control section 55. Note that, the LCD 57 may be a display panel of organic EL or the like, other than liquid crystal.

An image processing section 61 processes the image data from the imaging element 33 to generate the image data for live-view display on the LCD 57 or EVF 59. Moreover, in photographing, the image processing section generates the image data for storage, while in photographing a moving image it generates moving-image data.

A compression/expansion section 63 performs the JPEG compression processing or the like on the image data image-processed by the image processing section 61, and also performs the expansion processing on the image that is recorded on and read from a recording medium 67.

The recording medium 67 is an electrically-rewritable non-volatile external memory, on which image data is recorded and from which the image data is read by a recording-medium control section 65. On the recording medium 67, the image data for storage generated by the image processing section 61 and compression/expansion section 63 is recorded.

The main-body side CPU 50 controls each section inside the camera body 30 and each section inside the photographing lens 10 in accordance with a program stored on the memory 45, thereby controlling the whole camera system.

Figure 5:
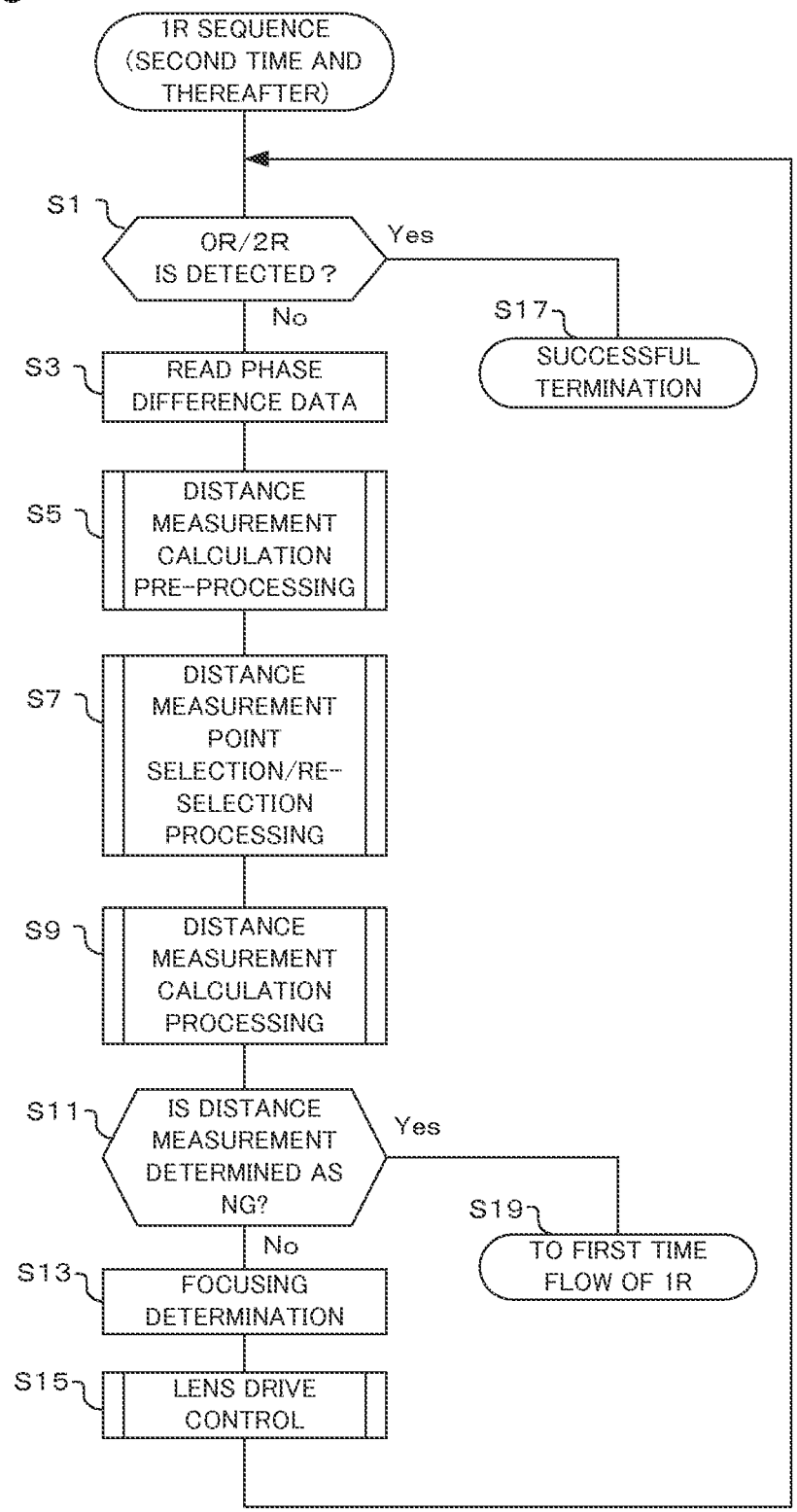
FIG. 5 is a flowchart showing a main operation of the camera in the embodiment of the present invention.
Figure 6:
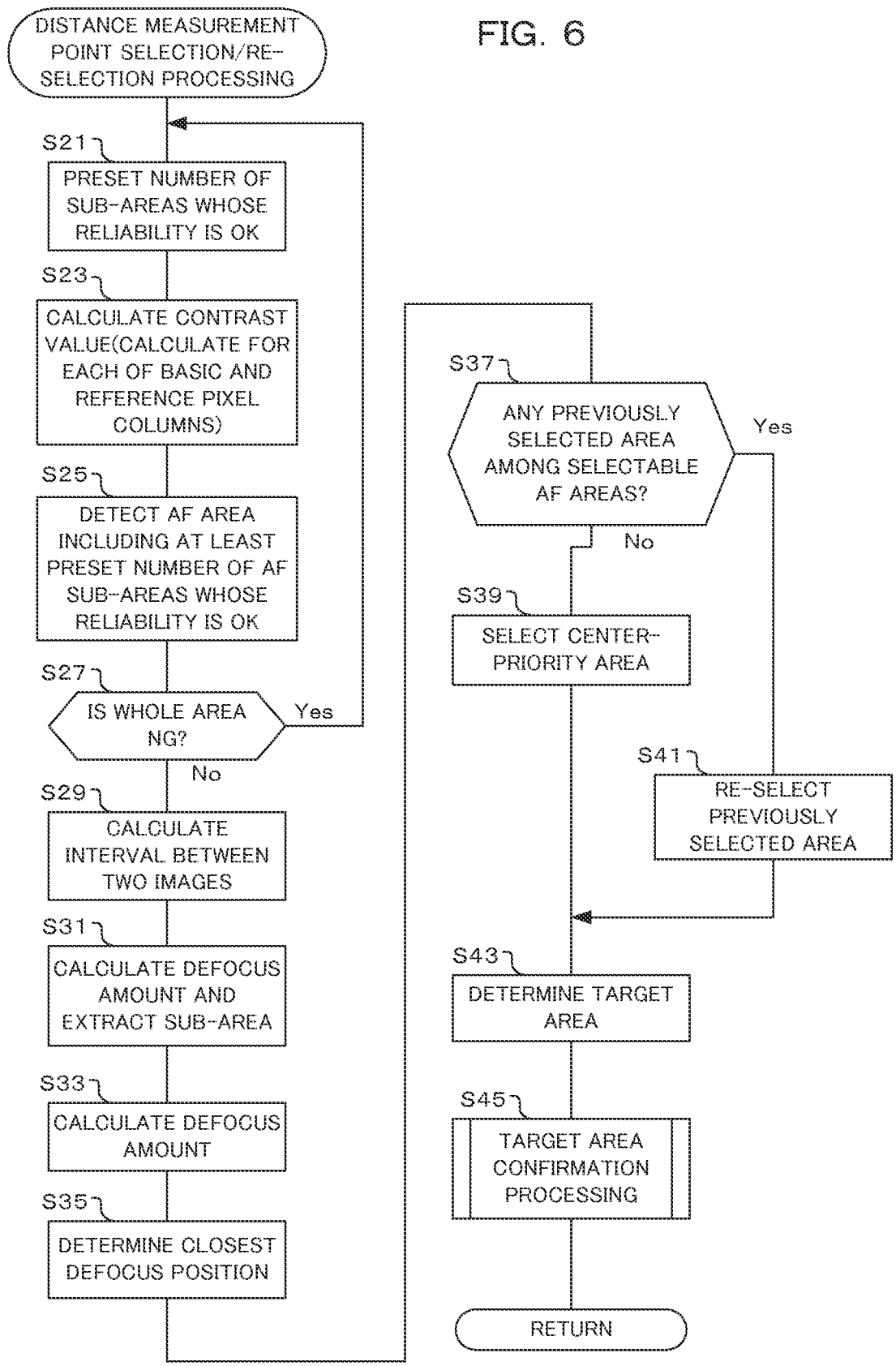
FIG. 6 is a flowchart showing a distance measurement point selection and re-selection procedure of the camera in the embodiment of the present invention.

The main-body side CPU 50 functions as a calculation section configured to perform, in cooperation with the AF processing section 49, correlation calculation based on a focus detection signal corresponding to each of a plurality of sub-areas and output a degree of reliability (e.g., see S5 of FIG. 5 and S25 of FIG. 6).

The main-body side CPU 50 functions as an AF area selection section configured to select an AF area including a large number of AF sub-areas in each of which the degree of reliability calculated corresponding to the plurality of sub-areas is higher (e.g., see S21 to S27 of FIG. 6).

The main-body side CPU 50 functions as a moving body prediction calculation section configured to perform moving body prediction calculation using distance measurement data that is calculated by the correlation calculation based on a focus detection signal of the selected AF area (e.g., see S15 of FIG. 5). Moreover, the moving body prediction calculation section calculates a degree of reliability of the correlation calculation based on the focus detection signal of the selected AF area, and selects an AF area again, based on this degree of reliability and the degree of reliability of an unselected AF area among a plurality of AF areas (e.g., see S7 of FIG. 5, and FIG. 6). Moreover, the moving body prediction calculation section calculates distance measurement data by the correlation calculation based on the focus detection signal of the selected AF area, and selects an AF area again when the absolute value of the distance measurement data is larger than a predetermined value (e.g., see S45 of FIG. 6 and S51 of FIG. 7). The predetermined value is set in accordance with the moving speed of an object (e.g., see S51 of FIG. 7). Moreover, the moving body prediction calculation section selects an unselected AF area again when the degree of reliability of the unselected AF area is higher than the degree of reliability of the selected AF area (e.g., see S53 to S59 of FIG. 7).

The main-body side CPU 50 functions as a focus control section configured to performs, in cooperation with the lens-side CPU 20 and the like, focus adjustment based on a result of the moving body prediction calculation.

Figure 2:
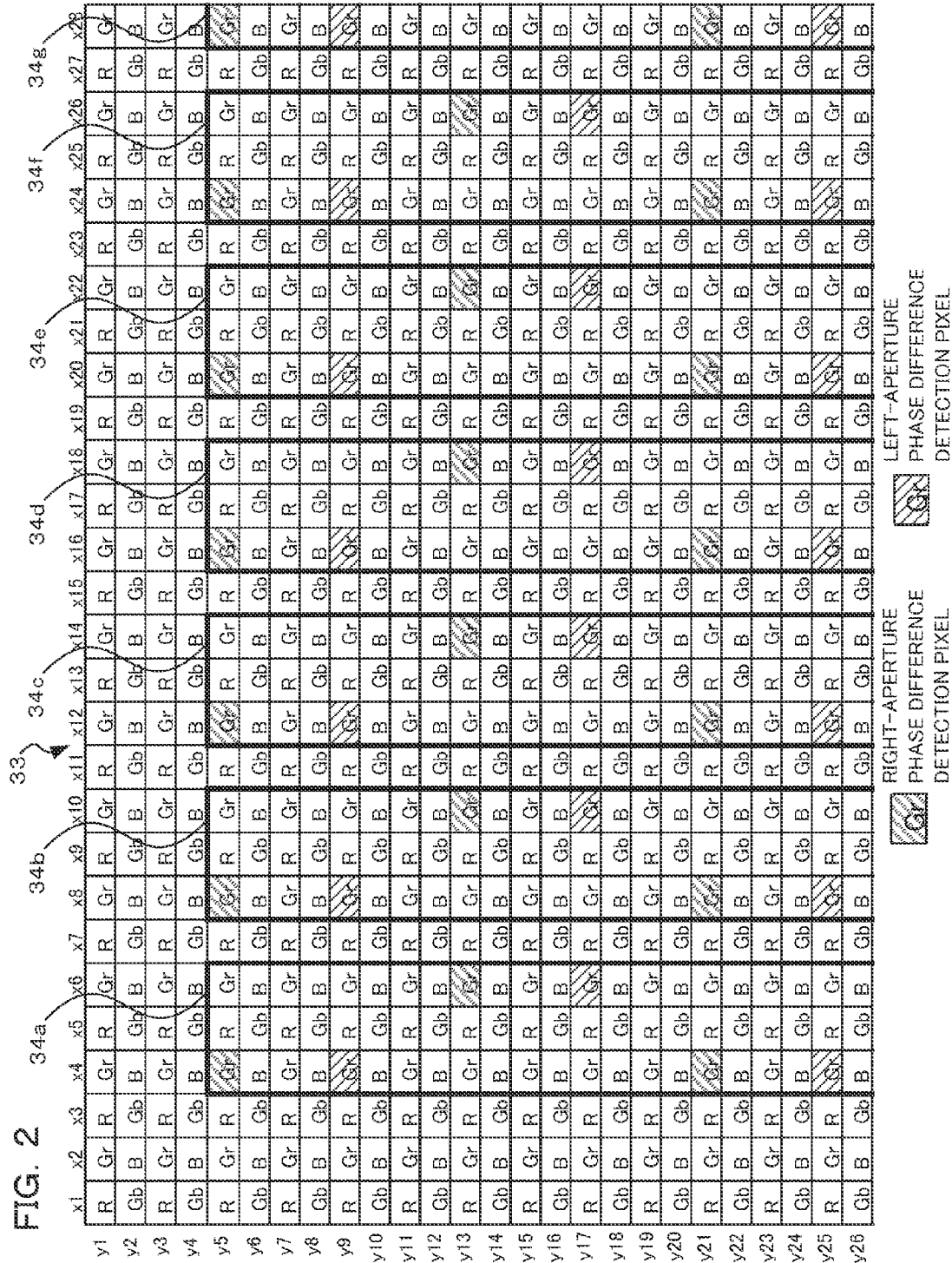
FIG. 2 is a plan view showing the arrangement of pixels of an imaging element of the camera according to the embodiment of the present invention.

Next, the arrangement of pixels of the imaging element 33 is described using FIG. 2. The imaging element 33 has a Bayer arrangement of R, Gr, Gb, and B pixels, in which the phase difference detection pixel is arranged in some of the Gr pixels. In the example of FIG. 2, a hatched pixel is the phase difference detection pixel. Among these pixels, the upward-hatched phase difference detection pixels ((x4, y5), (x8, y5), (x12, y5), (x16, y5), (x20, y5), . . . in the view) are right-aperture phase difference detection pixels, while the downward-hatched phase difference detection pixels (x4, y9), (x8, y9), (x12, y9), (x16, y9), (x20, y9), . . . in the view) are left-aperture phase difference detection pixels.

For each of thick line frames 34a, 34b, 34c, . . . provided in the imaging element 33 of FIG. 2, the right-aperture phase difference detection pixel and the left-aperture phase difference detection pixel are paired with each other, and the outputs thereof are summed in the vertical direction, respectively, to form the signal of the AF area. That is, inside the thick line frame 34a, the output of the right-aperture phase difference detection pixel is a summed value of the outputs of the pixels (x4, y5), (x6, y13), (x4, y21), . . . , while the output of the left-aperture phase difference detection pixel is a summed value of the outputs of the pixels (x4, y9), (x6, y17), (x4, y25), . . . . Similarly, for each of the thick line frames 34b, 34c, 34d, . . . , the output value of the right-aperture phase difference detection pixels and the output value of the left-aperture phase difference detection pixels are calculated.

Figure 3:
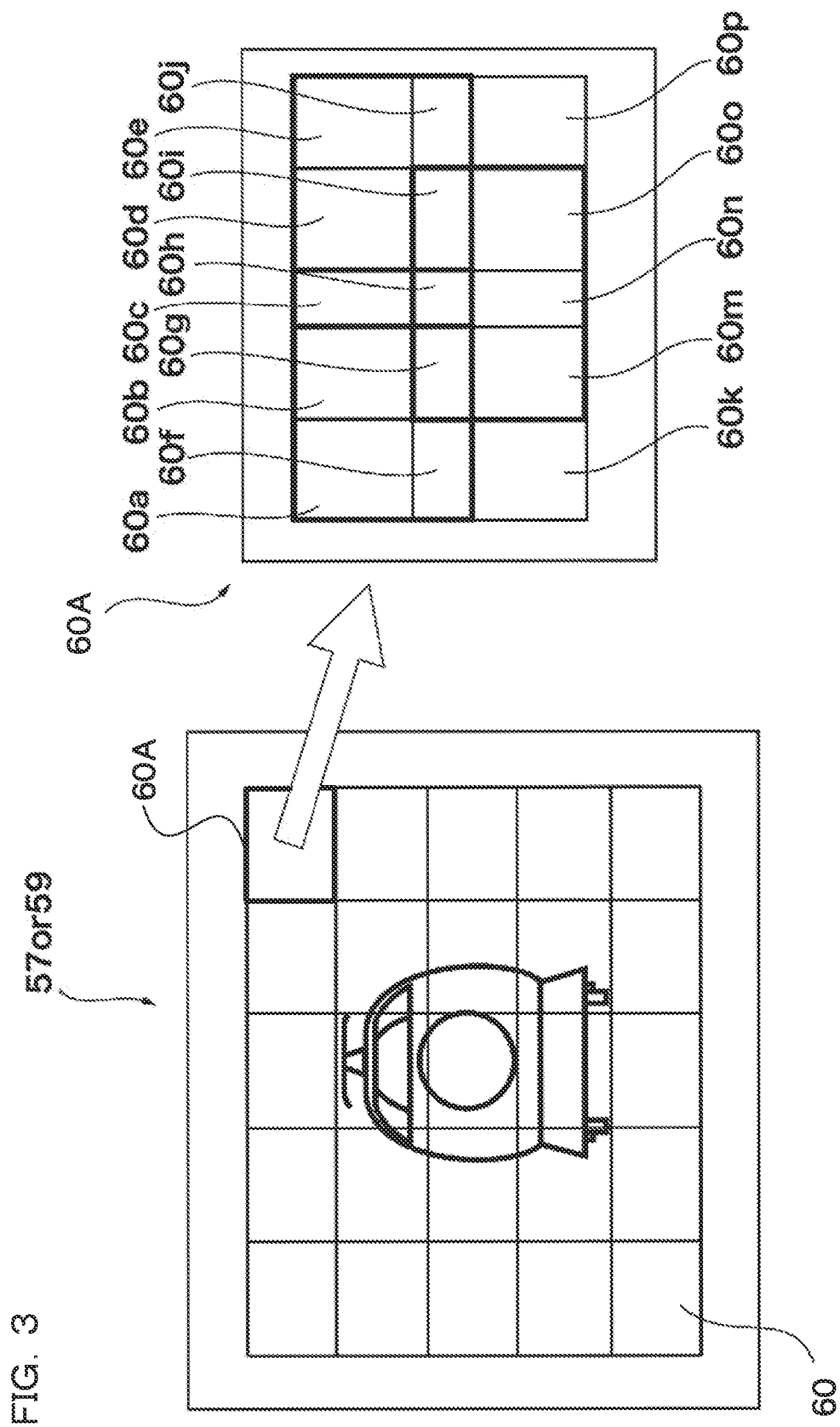
FIG. 3 shows an AF area and AF sub-area in the camera according to the embodiment of the present invention.

Next, the AF area and AF sub-area are described using FIG. 3. On the left of FIG. 3, an AF area 58 that is displayed on the LCD 57 or EVF 59 during photographing is shown. A plurality of AF areas 60 is provided, and a photographing screen is divided into rectangular portions and the defocusing amount is calculated in each AF area 60. In the example shown in FIG. 3, the AF area 60 is divided into rectangular portions, that is, divided into five areas in the vertical direction and divided into five areas in the horizontal direction, i.e., divided into 25 areas in total.

An AF area 60A shown on the right of FIG. 3 is one of a plurality of AF areas 60, illustrating that one AF area 60A is further divided into a plurality of AF sub-areas 60a to 60p. That is, one AF area 60A is divided into three rectangular areas in the vertical direction and divided into five rectangular areas in the horizontal direction, i.e., comprises 15 portions 60a to 60p in total. Then, the first AF sub-area comprises six portions, i.e., portions 60a, 60b, 60c, 60f, 60g, and 60h. The second AF sub-area comprises six portions, i.e., portions 60b, 60c, 60d, 60g, 60h, and 60i. The third AF sub-area comprises six portions, i.e., portions 60c, 60d, 60e, 60h, 60i, and 60j.

Similarly, using two lower tiers, the fourth to sixth AF sub-areas are set. As described above, each AF area comprises a total of six AF sub-areas, i.e., two portions in the vertical direction and three portions in the horizontal direction, while including some of the sub-areas overlappingly. Note that, the method for dividing the AF area 60 and AF sub-area 60A is illustrative only, and may be divided using another method. Each of a plurality of AF areas 60 is divided as with the AF sub-area 60A.

Each AF area 60 includes, as shown in FIG. 2, the imaging pixel used as a pixel for photographing and the phase difference detection pixel used for AF, and among the pixel values read from the imaging element 33, only a phase difference detection pixel arranged at a predetermined position is selectively used in AF calculation.

Figure 4:
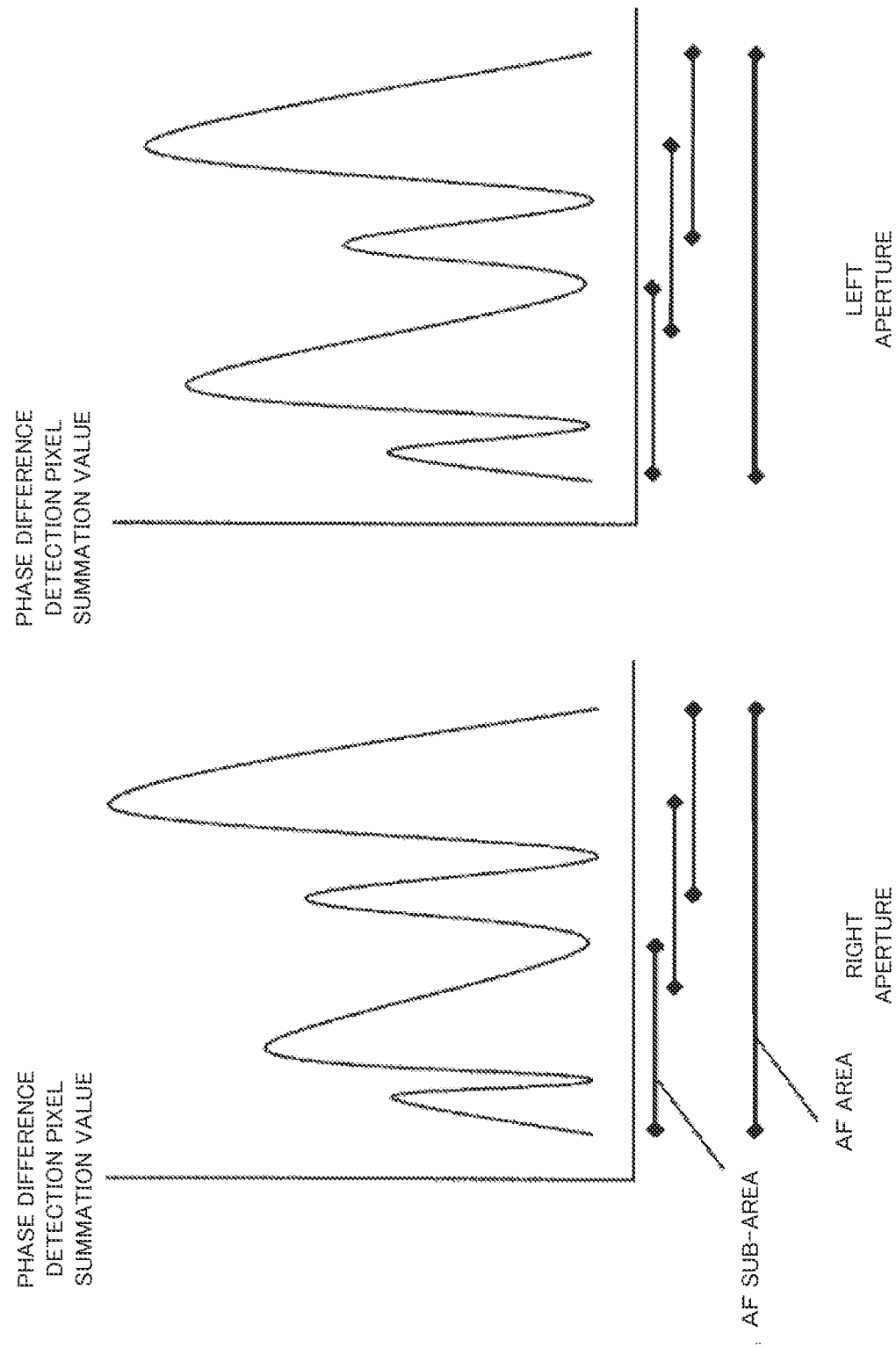
FIG. 4 is a graph showing a relationship between a pixel summation value and an AF sub-area in the camera according to the embodiment of the present invention.

FIG. 4 is a graph representing a value that is obtained by summing the pixel values in the vertical direction for each thick frame shown in FIG. 3, with regard to the phase difference detection pixels inside one AF area 60. The graph on the left of FIG. 4 represents the value that is obtained by summing the output values of the right-aperture phase difference detection pixels among the phase difference detection pixels, while the graph on the right of FIG. 4 represents the value that is obtained by summing the output values of the left-aperture phase difference detection pixels. In FIG. 4, only three AF sub-areas inside one AF area are shown.

Figure 7:
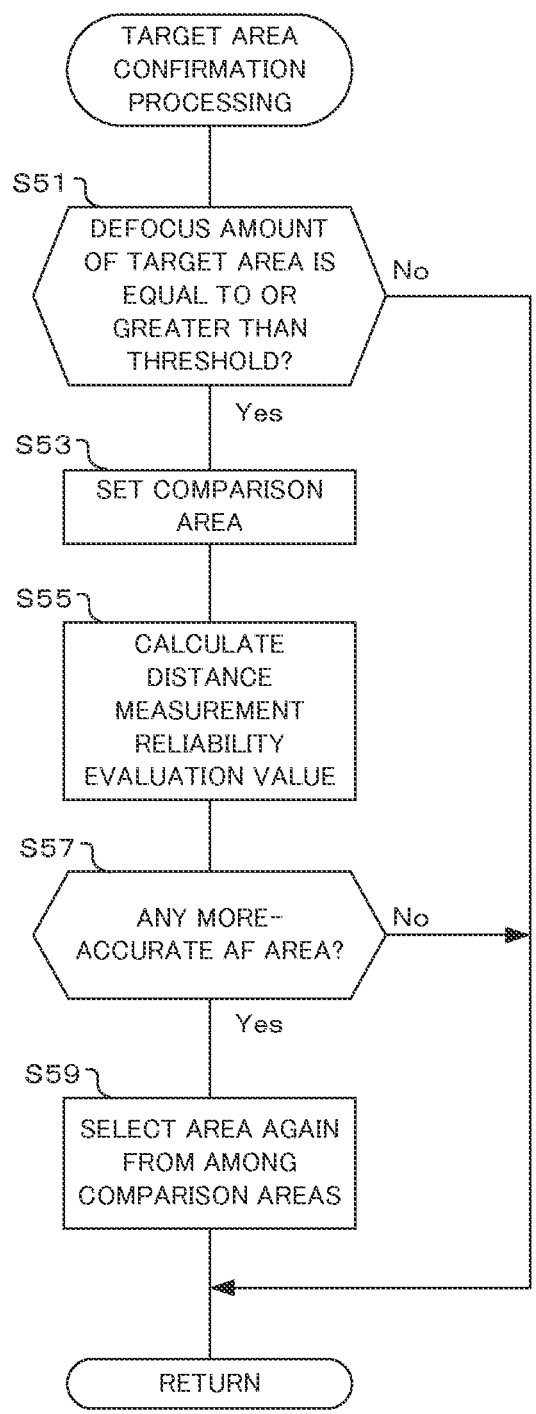
FIG. 7 is a flowchart showing target area confirmation of the camera in the embodiment of the present invention.

Next, the operation of the camera in the embodiment is described using flowcharts shown in FIGS. 5 to 7. These flowcharts are executed by the main-body side CPU 50 which controls, based on the program stored on the memory 45, each section inside the camera.

Note that, in the flowcharts, the C-AF mode is set and only the operation during 1R retention is described. In the C-AF mode, while a user half-presses a release button, image data is repeatedly obtained by the photographing elements 33 and the obtained image data is used for the calculation in the AF processing section 49. Moreover, "during 1R retention" refers to a case where a user continues to half-press a release button even after the user firstly half-presses the release button and the first time focus adjustment operation (the calculation in the AF processing section 49 and the focusing drive) is processed.

Entering the flow of a 1R sequence (second time and thereafter) shown in FIG. 5, first 0R/2R detection is performed (S1). 0R refers to a case where a user releases the finger from the release button, while 2R refers to a case where a user further presses in the release button from a half-press state. In this step, determination is performed based on a state signal of the release button from the UI control section 53. When 0R or 2R is detected as the result of this determination, it is not "during 1R retention", and therefore this 1R sequence (second time and thereafter) is finished, and then the flow transitions to another state, such as a non-illustrated 0R sequence or 2R sequence (S17).

When 0R or 2R has not been detected as the result of the determination in step S1, phase difference data is read (S3). Here, the pixel value of a phase difference detection pixel is read from the imaging element 33. Note that, pixel values including the pixel value of a phase difference detection pixel may be read from the imaging element 33, and among the pixel values, only the pixel value of the phase difference detection pixel may be extracted, or in reading pixel values, only the pixel value of a phase difference detection pixel may be selectively read.

Once the phase difference data is read in step S3, then distance measurement calculation pre-processing is performed (S5). Here, illuminance correction processing, correlation calculation, and reliability determination are performed as the pre-processing of the distance measurement calculation. In the illuminance correction processing, in order to uniform an image height-illuminance distribution caused by a lens, the pixel values of the right aperture and left aperture are corrected.

In the correlation calculation in the distance measurement calculation pre-processing of step S5, a correlation value is calculated using the pixel summation value for each AF area from the images of the right aperture (base signal) and left aperture (reference signal), by a well-known method. For example, in order to reduce the calculation amount, the correlation calculation uses a technique of scanning the reference signal with respect to the base signal, calculating the similarity at each position on the reference signal, and detecting a position of the maximum similarity. If the base signal is designated by B (i) and the reference signal by R(i), similarity S (i) is calculated using Formula (1) below. The scanning position of the reference signal where the similarity S(i) becomes the minimal value can be regarded as the position of the maximum similarity where the correlation between the base signal and the reference signal is the highest. Here, the correlation calculation is performed for each AF sub-area.

Formula (1)

$$S(i) = \sum_{i=1}^{N-1} |B(i) - R(i)| \quad (1)$$

The reliability determination processing in the distance measurement calculation pre-processing of step S5 performs the saturation determination of a pixel for each AF sub-area (when the pixel value is saturated, there is no reliability), contrast insufficiency determination (when the difference between the maximum value and minimum value of a pixel value is not more than a predetermined value, there is no reliability), monotonicity determination (when a pixel value monotonically increases or monotonically decreases with respect to the pixel position, there is no reliability), correlation calculation result determination (when the minimal value of the similarity S(i) is greater than a predetermined value, there is no reliability), and the like, and then evaluates the reliability of the correlation calculation result to set a flag indicating whether or not there is reliability (OK) for each AF sub-area. Note that the numeric data of the results calculated in the above-described various kinds of reliability determination processing is discarded without being stored, in order to reduce the memory capacity.

Once the distance measurement calculation pre-processing is performed in step S5, then distance measurement point selection/re-selection processing is performed (S7). Here, when the AF mode using a plurality of AF areas is already set, among AF areas capturing an object being photographed, an area where the distance measurement accuracy is higher (reliability is higher) is selected. The detailed operation of this distance measurement point selection/re-selection processing is described later using FIG. 6.

Once the distance measurement point selection/re-selection is performed in step S7, then distance measurement calculation processing is performed (S9). Here, defocusing amount calculation, defocus adjustment, and the like are performed using the pixel value of the phase difference detection pixel from a distance measurement point (AF area) that is re-selected in step S7.

Once the distance measurement calculation processing is performed in step S9, distance measurement NG determination is performed (S11). Here, based on the reliability of the correlation calculation result calculated in step S9, it is determined whether or not the distance measurement is NG. That is, in calculating the reliability of the correlation calculation result, the well-known reliability determination method is used which uses the gradient in a vicinity of the minimum value of the correlation value or the minimum value of the correlation value, for example. When the distance measurement is NG as the result of this determination, the flow transitions to the 1R sequence (the first time) and proceeds to a non-illustrated flow of the 1R sequence (the first time). Note that, as the condition for proceeding to the flow of the 1R sequence (the first time), the number of times of continuing NG of the distance measurement may be counted, and the case where the distance measurement continues to be NG a predetermined number of times or more may be set as the condition.

On the other hand, when the distance measurement is not NG as the result of the determination in step S11, focusing determination is performed (S13). Here, when the defocusing amount calculated in step S9 is smaller than a predetermined value, it is determined that focusing is made.

Once it is determined that focusing is made in step S13, then lens drive (LD) control is performed (S15). When it is determined that focusing is made as the result of the determination in step S13, the lens drive is not performed. On the other hand, when focusing is not made, the focus lens 11 is driven to a focusing position based on the defocusing amount calculated in step S9. In calculating the focusing position, when an object is determined as a moving body based on a plurality of defocusing amounts repeatedly calculated, the focusing position is calculated by performing the moving body prediction based on a plurality of defocusing amounts repeatedly calculated. Once the lens drive control toward this focusing position is performed, the flow returns to step S1, and the above-described operation is repeated. Note that, in order to reduce the calculation amount, the lens drive control may be performed toward a focusing position that is calculated from the defocusing amount when the absolute value of a defocusing amount becomes larger by a certain value or more.

Next, the distance measurement point selection/re-selection processing in step S7 is described using a flowchart shown in FIG. 6. Here, the following procedure is performed in order to detect an AF area with high reliability and determine an AF target using this AF area.

Entering the flow of the distance measurement point selection/re-selection processing of FIG. 6, an AF area with high reliability is detected in steps S21 to S27. First, the number of sub-areas whose reliability is OK is set (S21). When among a plurality of AF sub-areas constituting an AF area, the number of AF sub-areas with high reliability is larger than a preset number as the predetermined threshold, the reliability of the AF area is determined as high (reliability is OK). Then, in step S21, in determining that the reliability is OK, the number of AF sub-areas with high reliability that is used as the threshold is set. In the example shown in FIG. 3, since the number of AF sub-areas is six, six is the largest settable number in this case. When the number is large, reliability determination becomes severe, while when the number is small, reliability determination becomes relaxed. Here, the preset number of AF sub-areas is designated by Rn.

Once the number of sub-areas whose reliability is OK is set in step S21, then a contrast value is calculated (calculated for each of the basic and reference pixel columns) (S23). In this step, first, based on the pixel value of a phase difference detection pixel from the imaging element 33, the maximum value and the minimum value are calculated for each of the base signal (e.g., of the right aperture) and reference signal (e.g., of the left aperture), and a difference between the maximum value and the minimum value is calculated as the contrast value. When the contrast value of the base signal calculated here is designated by Bc and the contrast value of the reference signal by Rc, a contrast value Ac for each area is calculated by Formula (2) below.

$$Ac=\min(Bc,Rc) \quad (2)$$

Where min( ) means selecting the minimum value of input values (here, Bc and Rc). The contrast value Ac calculated here is used in target area confirmation processing (see S45).

Once the contrast value is calculated in step S23, then an AF area including at least the preset number of AF sub-areas whose reliability is OK is detected (S25). Here, with reference to a flag (set in step S5) indicating whether or not the reliability of an AF sub-area belonging to each AF area is OK, an AF area is detected in which the number of AF sub-areas whose reliability is OK is larger than the number set in step S21.

In step S25, an AF area, in which the number of AF sub-areas whose reliability is OK is greater than the preset number, is used as an effective area in the subsequent procedure (steps S29 and thereafter). On the other hand, an AF area, in which the number of AF sub-areas whose reliability is OK is not more than the preset number, is regarded as an ineffective area and is not used in the subsequent procedure.

Once the AF area including at least a preset number of AF sub-areas whose reliability is OK is detected in step S25, then it is determined whether or not the whole AF area is NG (S27). Here, the determination is made based on the detection result in step S25. When with regard to the whole AF area, the number of AF sub-areas whose reliability is OK is less than a preset value as the result of this determination, the flow returns to step S21 and the number Rn of AF sub-areas is reduced and the procedure is performed again.

When the whole area is not NG as the result of the determination in step S27, then the interval between two images is calculated (S29). Here, with regard to an AF area whose reliability has been determined as OK in step S25, the AF processing section 49 performs correlation calculation for each AF sub-area using the pixel value of a phase difference detection pixel of the imaging element 33, and calculates the interval between two images based on this result. Note that, the interval between two images is calculated based on a shift amount (scanning position) that is calculated by calculating how many pixels to shift for the waveform of the base signal (e.g., of the right aperture) and the waveform of the reference signal (e.g., of the left aperture) to match.

The above-described distance measurement reliability evaluation value is defined as follows. A distance measurement reliability evaluation value AFr is calculated by Formula (3) below using the contrast value Ac and a minimal value Fmin of correlation calculation.

$$AFr=Ac/Fmin \quad (3)$$

FIG. 8A and FIG. 8B are graphs representing the calculated similarity (correlation value) between the base signal (e.g., of the right aperture) and the reference signal (e.g., of the left aperture) on the vertical axis and the shift amount between the base signal and the reference signal on the horizontal axis. When the waveforms of the base signal and reference signal are similar, the minimal value Fmin takes a small value, resulting in a steep curve as shown in FIG. 8A. On the other hand, when the waveforms of the base signal and reference signal are not similar, the minimal value Fmin takes a large value, resulting in a gentle curve as shown in FIG. 8B.

Accordingly, the distance measurement reliability evaluation value AFr becomes a large value when the contrast value Ac is large and the minimal value Fmin is small. On the other hand, the distance measurement reliability evaluation value AFr becomes a small value when the contrast value Ac is small and the minimal value Fmin is large.

As described above, in step S25, the distance measurement reliability evaluation value AFr is calculated using the contrast value Ac for each AF sub-area and the minimal value Fmin of correlation calculation. The calculated distance measurement reliability evaluation value AFr is used in the procedure described later.

Once the interval between two images is calculated in step S29, then a sub-area is extracted for calculating the defocusing amount (S31). Here, the AF sub-area is extracted using the distance measurement reliability evaluation value AFr. For example, among the AF sub-areas whose reliability is OK, an AF sub-area whose distance measurement reliability evaluation value AFr is equal to or greater than a predetermined value is set to the area to be extracted. In step S31, the distance measurement reliability evaluation value AFr of the extracted AF sub-area is evaluated to determine an AF sub-area for calculating the defocusing amount. For example, in a case where there is a plurality of AF sub-areas whose reliability is OK, when the distance measurement reliability evaluation value AFr of a certain AF sub-area is larger than the distance measurement reliability evaluation values AFr of another AF sub-area, the AF sub-area with a larger distance measurement reliability evaluation value AFr is selected. Note that, the selection of an AF sub-area is not limited to the above-described method, but an AF sub-area may be determined by evaluating a magnitude relationship between the distance measurement reliability evaluation values AFr.

Once the AF sub-area for calculating the defocusing amount is extracted in step S31, then defocusing amount calculation is performed (S33). Here, with regard to the extracted AF sub-area, a defocusing amount is calculated from the interval between two images using a well-known method.

Once the defocusing amount is calculated in step S33, then the closest defocus position is determined (S35). Here, the closest defocus position is determined using the defocusing amount that is calculated for the AF sub-area extracted in step S33. In determining the closest defocus position, the defocusing amount of each AF area is compared with each other, and when the defocusing amount of an AF area is extremely large as compared with the defocusing amounts of the other AF areas and is determined as nearer to the closest defocus position, the AF area is determined as an AF area providing false distance measurement and is excluded from the subsequent procedure. In this manner, a selectable AF area and an unselectable AF area are determined. This selectable AF area will serve as a selectable AF area also in the subsequent procedure.

Once the closest defocus position determination is performed in step S35, then it is determined whether or not there is any previously selected AF area among the selectable AF areas (S37). Here, it is determined whether there is any previously selected AF area among remaining AF areas. That is, in step S27, an AF area with low reliability is excluded, and further more in step S31, an AF sub-area with low reliability is excluded, and furthermore, the defocusing amount of an AF area possibly providing false distance measurement is excluded in step S35. Therefore, in step S37, the determination on the remaining AF areas with high reliability is made. Note that, for the purpose of this determination, the previously selected AF area is temporarily stored in the memory 45.

When there is a previously selected AF area as the result of the determination in step S37, the previously selected AF area is re-selected (S41). In the procedure in steps S21 to S35, an AF area with low distance measurement reliability is already removed. In determination in step S37, when there is a previously selected AF area among the AF areas that remain as having high reliability, this previously selected AF area is re-selected in consideration of the continuity of the C-AF mode.

On the other hand, as the result of the determination in step S37, when there is no previously selected AF area among the selectable AF areas, a center-priority area is selected (S39). In this case, since the previously selected AF area is not a selectable AF area, an AF area is selected in the order of a predetermined center priority or the like. Note that, other than the center priority, an AF area may be selected according to other criteria, such as the closest distance priority inside a selectable AF area.

Once an AF area is selected in step S39 or S41, then a target area is determined (S43). The target area is an AF area that has been determined to be employed in order to actually perform the AF operation. For example, a plurality of AF areas may be selected in S39, and one AF area among the plurality of AF areas is determined as the target.

Once the target area is determined in step S43, then target area confirmation processing is performed (S45). The target area confirmation processing suppresses a distance measurement variation due to false selection of the target area that occurs in a mode using a plurality of AF areas. It is determined, by carrying out the target area confirmation processing after determining the target area, whether or not the determined target area is appropriate. The detailed operation of this target area confirmation processing is described using FIG. 7. Once the target area confirmation processing is performed, the flow returns to the original flow.

As described above, in the flow of the distance measurement point selection/re-selection processing, first, the number of AF sub-areas whose reliability has been determined as OK is detected for each AF area, and an AF area, in which this number of AF sub-areas whose reliability has been determined as OK is equal to or greater than a preset number, is set to a candidate for the distance measurement point (S21 to S27). Then, an AF area with high reliability is extracted and the defocusing amount is calculated (S29 to S33), and if there is a previously selected AF area among the selectable AF areas, this AF area is selected, while if there is no previously selected AF area among the selectable AF areas, an AF area is selected based on a predetermined criterion, such as center priority. This allows to select an AF area with high reliability while placing an importance on a previously selected AF area.

Next, the target area confirmation processing in step S45 is described using a flowchart shown in FIG. 7.

Entering the flow of the target area confirmation processing, first it is determined whether or not the defocusing amount of a target area is equal to or greater than a threshold (S51). This threshold is set to a value corresponding to the moving range of an object moving at an assumed speed, and when the defocusing amount is equal to or greater than the threshold, it may be determined that false distance measurement has occurred because the object corresponds to an object moving at an abnormally high speed. Here, the absolute value of a defocusing amount calculated in the target area determined in step S43 is compared with a threshold for determination. When the defocusing amount is not equal to nor greater than the threshold as the result of this determination, it is determined that there is an object within the previously assumed distance range and that the reliability is high, and therefore the target area determined in Step 43 is used without being changed, and the flow of the target area confirmation processing is finished.

When the defocusing amount of the target area is equal to or greater than the threshold as the result of the determination in step S51, then in steps S53 to S59 if there is any more-accurate AF area, the AF area is changed to this more-accurate AF area. However, this change is made only when a plurality of AF areas is selectable.

First, a comparison area is set (S53). Here, an AF area, which has not been employed as the target area, among the selectable AF areas determined in steps S27 (No) to S35, is set as the comparison area.

Once the comparison area is set in step S53, then a distance measurement reliability evaluation value is calculated (S55). Here, in the AF target area and in each AF area set as the comparison area, the distance measurement reliability evaluation value AFr is calculated.

Once the distance measurement reliability evaluation value is calculated in step S55, then it is determined whether or not there is any more-reliable, i.e., more-accurate, AF area (S57). Here, the distance measurement reliability evaluation value AFr of the AF target area is compared with that of the comparison area, and it is determined whether or not there is any AF area with a distance measurement reliability evaluation value AFr higher than the distance measurement reliability evaluation value AFr in the AF target area.

When there is any more-reliable, i.e., more-accurate, AF area as the result of the determination in step S57, the area is selected again from among the comparison areas (S59). Here, an AF area with high reliability, i.e., with high accuracy, in the determination in step S57, is selected as the AF target area. Once an AF area is re-selected, the flow returns to the original flow. On the other hand, when there is no more-accurate AF area as the result of the determination in step S57, the flow returns to the original flow without re-selecting any AF target area.

As described above, in the flow of the target area confirmation processing, when the defocusing amount of a target area is equal to or greater than the threshold (Yes in S51), the distance measurement reliability evaluation value AFr of the AF target area is compared with the distance measurement reliability evaluation value AFr of another reliable AF area, while when the distance measurement reliability evaluation value AFr of the AF target area is the maximum, the AF target area is used as is without being changed. On the other hand, when there is the maximum value in an AF area among reliable AF areas, the AF target area is replaced with this AF area, for example (S53 to S59). Therefore, the distance measurement result of the AF area with a higher distance measurement reliability can be used and the distance measurement variation can be suppressed.

As described above, the camera in one embodiment of the present invention includes the imaging element 33 which generates the focus detection signal by pupil-dividing and photoelectrically converting the light flux from the photographing optical system (focus lens 11 and the like), in which each of a plurality of AF areas 60 is divided into a plurality of AF sub-areas (see FIG. 3) and autofocus is performed using the plurality of AF areas. Then, the method for controlling the camera includes: a calculation step of performing correlation calculation based on a focus detection signal corresponding to each of the plurality of AF sub-areas and outputting a degree of reliability (S5 of FIG. 5 and S25 of FIG. 6); an AF area selection step of selecting an AF area including a large number of sub-areas in each of which the degree of reliability calculated corresponding to the plurality of sub-areas is higher (S21, S25, and S27 of FIG. 6); and a focus control step of performing focus adjustment using distance measurement data that is calculated by the correlation calculation based on a focus detection signal of the selected AF area (S33 and S43 of FIG. 6, and S15 of FIG. 5). Therefore, the distance measurement variation can be suppressed and a moving body can be accurately photographed by continuous AF.

Note that, in one embodiment of the present invention, phase difference detection pixels are arranged in an imaging element, and focus detection by a phase difference method is performed. However, not limited thereto, and needless to say that a dedicated sensor for phase difference detection may be provided.

Moreover, in one embodiment of the present invention, when the mode is set to the C-AF mode, focus detection is performed based on moving body prediction, but the focus may be adjusted simply in accordance with the result of the focus detection using the phase difference method, without performing the moving body prediction.

Moreover, in each of the embodiments of the present invention, the AE processing section 47, AF processing section 49, display control section 55, image processing section 61, and compression/expansion section 63 are configured independently of the main-body side CPU 50, but needless to say that all of or a part of each section may be configured by software and performed by the main-body side CPU 50.

Moreover, in the embodiment, as the device for photographing, a digital camera has been used and described, but as the camera, a digital single lens reflex camera or a compact digital camera may be used, or a camera, such as a video camera or a movie camera, for moving images may be used. Furthermore, a camera incorporated into a portable telephone, a smart phone, a Personal Digital Assist (PDA), a personal computer (PC), a tablet type computer, a game machine device, or the like may be used. In any case, the present invention is applicable to any device that detects the focus using the phase difference method.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible to form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device which includes an imaging element having a phase difference detection pixel formed therein that generates a focus detection signal by pupil-dividing and photoelectrically converting a light flux from a photographing optical system, and which performs autofocus using a plurality of AF areas each including a plurality of sub-areas that is obtained by dividing the AF area, the imaging device comprising:
    a calculation section configured to perform correlation calculation based on a focus detection signal corresponding to each of the plurality of sub-areas and output a degree of reliability;
    an AF area selection section configured to select an AF area including a large number of sub-areas in each of which the degree of reliability calculated corresponding to the plurality of sub-areas is higher;
    a moving body prediction calculation section configured to perform moving body prediction calculation using distance measurement data that is calculated by the correlation calculation based on a focus detection signal of the selected AF area; and
    a focus control section configured to perform focus adjustment based on a result of the moving body prediction calculation.

2. The imaging device according to claim 1, wherein the moving body prediction calculation section calculates a degree of reliability of the correlation calculation based on the focus detection signal of the selected AF area, and selects an AF area again, based on the degree of reliability and a degree of reliability of an unselected AF area among the plurality of AF areas.

3. The imaging device according to claim 2, wherein the moving body prediction calculation section calculates distance measurement data by the correlation calculation based on the focus detection signal of the selected AF area, and selects an AF area again when the distance measurement data is larger than a predetermined value.

4. The imaging device according to claim 3, wherein the predetermined value is set in accordance with a moving speed of an object.

5. The imaging device according to claim 2, wherein the moving body prediction calculation section selects the unselected AF area again when the degree of reliability of the unselected AF area is higher than the degree of reliability of the selected AF area.

6. A control method for an imaging device, which includes an imaging element that generates a focus detection signal by pupil-dividing and photoelectrically converting a light flux from a photographing optical system, in which each of a plurality of AF areas is divided into a plurality of sub-areas, and which performs autofocus using the plurality of AF areas, the control method comprising:
- a calculation step of performing correlation calculation based on a focus detection signal corresponding to each of the plurality of sub-areas, and outputting a degree of reliability;
- an AF area selection step of selecting an AF area including a large number of sub-areas in each of which the degree of reliability calculated corresponding to the plurality of sub-areas is higher; and
- a focus control step of performing focus adjustment using distance measurement data that is calculated by the correlation calculation based on a focus detection signal of the selected AF area.

7. The control method for an imaging device according to claim 6, wherein the AF area selection step calculates a degree of reliability of the correlation calculation based on the focus detection signal of the selected AF area, and selects an AF area again based on the degree of reliability and a degree of reliability of an unselected AF area among the plurality of AF areas.

8. The control method for an imaging device according to claim 7, wherein the AF area selection step calculates distance measurement data by the correlation calculation based on the focus detection signal of the selected AF area, and selects an AF area again when the distance measurement data is larger than a predetermined value.

9. The control method for an imaging device according to claim 8, wherein the predetermined value is set in accordance with a moving speed of an object.

10. The control method for an imaging device according to claim 7, wherein the AF area selection step selects the unselected AF area again when a degree of reliability of the unselected AF area is higher than a degree of reliability of the selected AF area.

11. A non-transitory computer-readable medium storing a computer program for controlling an imaging device, which includes an imaging element that generates a focus detection signal by pupil-dividing and photoelectrically converting a light flux from a photographing optical system, in which each of a plurality of AF areas is divided into a plurality of sub-areas, and which performs autofocus using the plurality of AF areas, the computer program causing a computer to execute a control method, the method comprising:
- a calculation step of performing correlation calculation based on a focus detection signal corresponding to each of the plurality of sub-areas, and outputting a degree of reliability;
- an AF area selection step of selecting an AF area including a large number of sub-areas in each of which the degree of reliability calculated corresponding to the plurality of sub-areas is higher; and
- a focus control step of performing focus adjustment using distance measurement data that is calculated by the correlation calculation based on a focus detection signal of the selected AF area.

12. The non-transitory computer-readable medium according to claim 11, wherein the AF area selection step calculates a degree of reliability of the correlation calculation based on the focus detection signal of the selected AF area, and selects an AF area again based on the degree of reliability and a degree of reliability of an unselected AF area among the plurality of AF areas.

13. The non-transitory computer-readable medium according to claim 12, wherein the AF area selection step calculates distance measurement data by the correlation calculation based on the focus detection signal of the selected AF area, and selects an AF area again when the distance measurement data is larger than a predetermined value.

14. The non-transitory computer-readable medium according to claim 13, wherein the predetermined value is set in accordance with a moving speed of an object.

15. The non-transitory computer-readable medium according to claim 12, wherein the AF area selection step selects the unselected AF area again when a degree of reliability of the unselected AF area is higher than a degree of reliability of the selected AF area.

* * * * *